United States Patent
Ohta et al.

(10) Patent No.: US 11,838,134 B2
(45) Date of Patent: *Dec. 5, 2023

(54) TRANSMITTING DEVICE AND BUFFER CONTROL METHOD

(71) Applicant: FUJITSU LIMITED, Kawasaki (JP)

(72) Inventors: Yoshiaki Ohta, Yokohama (JP); Takayoshi Ode, Yokohama (JP); Yoshihiro Kawasaki, Kawasaki (JP); Nobuhisa Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,353

(22) Filed: Nov. 22, 2022

(65) Prior Publication Data

US 2023/0082263 A1 Mar. 16, 2023

Related U.S. Application Data

(63) Continuation of application No. 17/128,185, filed on Dec. 20, 2020, now Pat. No. 11,539,477, which is a
(Continued)

(51) Int. Cl.
*H04L 1/1867* (2023.01)
*H04W 76/27* (2018.01)
(Continued)

(52) U.S. Cl.
CPC .......... *H04L 1/1874* (2013.01); *H04W 28/04* (2013.01); *H04W 76/27* (2018.02); *H04W 80/02* (2013.01)

(58) Field of Classification Search
CPC ...... H04L 1/1874; H04L 47/31; H04W 28/04; H04W 76/27; H04W 80/02; H04W 72/06; H04W 72/10; Y02D 30/70
See application file for complete search history.

(56) References Cited

U.S. PATENT DOCUMENTS

| | | | |
|---|---|---|---|
| 8,855,047 | B2 | 10/2014 | Sammour et al. |
| 2009/0103478 | A1* | 4/2009 | Sammour ............... H04L 69/28 370/328 |

(Continued)

FOREIGN PATENT DOCUMENTS

| | | |
|---|---|---|
| CN | 101965705 A | 2/2011 |
| JP | 2006-135486 A | 5/2006 |

(Continued)

OTHER PUBLICATIONS

3GPP TSG-RAN2 Meeting #101b; R2-1805491; Source to WG: Huawei, HiSilicon, Oppo, LG Electronics Inc.; Title: Introduction of additional PDCP discard timer; Sanya, China, Apr. 16-20, 2018 (Year: 2018).*

(Continued)

*Primary Examiner* — Mohammed S Chowdhury
(74) *Attorney, Agent, or Firm* — Myers Wolin, LLC

(57) ABSTRACT

A transmitting device includes a first layer processor configured to include a buffer to store therein transmission data, the first layer processor configured to execute processing for a first layer on the transmission data, a second layer processor configured to execute processing for a second layer that differs from the first layer on the transmission data, and a transmitter configured to transmit the transmission data processed by the first layer processor and the second layer processor. The first layer processor discards the transmission data stored in the buffer in accordance with a parameter used for transmission control in the processing for the second layer.

7 Claims, 6 Drawing Sheets

Related U.S. Application Data continuation of application No. PCT/JP2018/023500, filed on Jun. 20, 2018.

(51) Int. Cl.
*H04W 28/04* (2009.01)
*H04W 80/02* (2009.01)

(56) References Cited

U.S. PATENT DOCUMENTS

| | | |
|---|---|---|
| 2011/0188377 A1 | 8/2011 | Kim et al. |
| 2014/0105112 A1 | 4/2014 | Chun et al. |
| 2016/0286426 A1 | 9/2016 | Chun et al. |
| 2016/0338132 A1* | 11/2016 | Uchino .......... H04L 5/001 |
| 2017/0237837 A1 | 8/2017 | Sammour et al. |
| 2018/0310308 A1 | 10/2018 | Loehr et al. |
| 2019/0182896 A1 | 6/2019 | Shrestha et al. |
| 2021/0144580 A1 | 5/2021 | Alfarhan et al. |
| 2021/0227422 A1* | 7/2021 | Sharma .......... H04W 80/02 |

FOREIGN PATENT DOCUMENTS

| | | |
|---|---|---|
| JP | 2010-536234 A | 11/2010 |
| JP | 2014-131361 A | 7/2014 |
| WO | 2015/141478 A1 | 9/2015 |

OTHER PUBLICATIONS

3GPP TSG-RAN WG2 #101bis; R2-1806186; Source: Ericsson; Title: L2 differentiated handling of critical data; Sanya, P.R. of China, Apr. 16-20, 2018 (Year: 2018).*

3GPP TS 36.212 V15.1.0, "3rd Generation Partnership Project; Technical Specification Group Radio Access Network; Evolved Universal Terrestrial Radio Access (E-UTRA); Multiplexing and channel coding (Release 15)", Mar. 2018.

3GPP TS 36.213 V15.1.0, "3rd Generation Partnership Project; Technical Specification Group Radio Access Network; Evolved Universal Terrestrial Radio Access (E-UTRA); Physical layer procedures (Release 15)", Mar. 2018.

3GPP TS 36.300 V15.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Mar. 2018.

3GPP TS 36.133 V15.2.0, "3rd Generation Partnership Project; Technical Specification Group Radio Access Network; Evolved Universal Terrestrial Radio Access (E-UTRA); Requirements for support of radio resource management (Release 15)", Mar. 2018.

3GPP TS 36.211 V15.1.0, "3rd Generation Partnership Project; Technical Specification Group Radio Access Network; Evolved Universal Terrestrial Radio Access (E-UTRA); Physical channels and modulation (Release 15)", Mar. 2018.

3GPP TS 36.321 V15.1.0, "3rd Generation Partnership Project; Technical Specification Group Radio Access Network; Evolved Universal Terrestrial Radio Access (E-UTRA); Medium Access Control (MAC) protocol specification (Release 15)", Mar. 2018.

3GPP TS 36.322 V15.0.1, "3rd Generation Partnership Project; Technical Specification Group Radio Access Network; Evolved Universal Terrestrial Radio Access (E-UTRA); Radio Link Control (RLC) protocol specification (Release 15)", Apr. 2018.

3GPP TS 36.323 V14.5.0, "3rd Generation Partnership Project; Technical Specification Group Radio Access Network; Evolved Universal Terrestrial Radio Access (E-UTRA); Packet Data Convergence Protocol (PDCP) specification (Release 14)", Dec. 2017.

3GPP TS 36.331 V15.1.0, "3rd Generation Partnership Project; Technical Specification Group Radio Access Network; Evolved Universal Terrestrial Radio Access (E-UTRA); Radio Resource Control (RRC); Protocol specification (Release 15)", Mar. 2018.

3GPP TS 36.413 V15.1.0, "3rd Generation Partnership Project; Technical Specification Group Radio Access Network; Evolved Universal Terrestrial Radio Access Network (E-UTRAN); S1 Application Protocol (S1AP) (Release 15)", Mar. 2018.

3GPP TS 36.423 V15.1.0, "3rd Generation Partnership Project; Technical Specification Group Radio Access Network; Evolved Universal Terrestrial Radio Access Network (E-UTRAN); X2 application protocol (X2AP) (Release 15)", Mar. 2018.

3GPP TS 36.425 V14.1.0, "3rd Generation Partnership Project; Technical Specification Group Radio Access Network; Evolved Universal Terrestrial Radio Access Network (E-UTRAN); X2 interface user plane protocol (Release 14)", Mar. 2018.

3GPP TS 37.340 V15.1.0, "3rd Generation Partnership Project; Technical Specification Group Radio Access Network; Evolved Universal Terrestrial Radio Access (E-UTRA) and NR; Multi-connectivity; Stage 2 (Release 15)", Mar. 2018.

3GPP TS 38.201 V15.0.0, "3rd Generation Partnership Project; Technical Specification Group Radio Access Network; NR; Physical layer; General description (Release 15)3rd Generation Partnership Project; Technical Specification Group Radio Access Network; NR; Physical layer; General description (Release 15)", Dec. 2017.

3GPP TS 38.202 V15.1.0, "3rd Generation Partnership Project; Technical Specification Group Radio Access Network; NR; Services provided by the physical layer (Release 15)", Mar. 2018.

3GPP TS 38.211 V15.1.0, "3rd Generation Partnership Project; Technical Specification Group Radio Access Network; NR; Physical channels and modulation (Release 15)", Mar. 2018.

3GPP TS 38.212 V15.1.1, "3rd Generation Partnership Project; Technical Specification Group Radio Access Network; NR; Multiplexing and channel coding (Release 15)", Apr. 2018.

3GPP TS 38.213 V15.1.0, "3rd Generation Partnership Project; Technical Specification Group Radio Access Network; NR; Physical layer procedures for control (Release 15)", Mar. 2018.

3GPP TS 38.214 V15.1.0, "3rd Generation Partnership Project; Technical Specification Group Radio Access Network; NR; Physical layer procedures for data (Release 15)", Mar. 2018.

3GPP TS 38.215 V15.1.0, "3rd Generation Partnership Project; Technical Specification Group Radio Access Network; NR; Physical layer measurements (Release 15)" Mar. 2018.

3GPP TS 38.300 V15.1.0, "3rd Generation Partnership Project; Technical Specification Group Radio Access Network; NR; NR and NG-RAN Overall Description; Stage 2 (Release 15)", Mar. 2018.

3GPP TS 38.321 V15.1.0, "3rd Generation Partnership Project; Technical Specification Group Radio Access Network; NR; Medium Access Control (MAC) protocol specification (Release 15)", Mar. 2018.

3GPP TS 38.322 V15.1.0, "3rd Generation Partnership Project; Technical Specification Group Radio Access Network; NR; Radio Link Control (RLC) protocol specification (Release 15)", Mar. 2018.

3GPP TS 38.323 V15.1.0, "3rd Generation Partnership Project; Technical Specification Group Radio Access Network; NR; Packet Data Convergence Protocol (PDCP) specification (Release 15)". Mar. 2018.

3GPP TS 38.331 V15.1.0, "3rd Generation Partnership Project; Technical Specification Group Radio Access Network; NR: Radio Resource Control (RRC) protocol specification (Release 15)", Mar. 2018.

3GPP TS 38.401 V15.1.0, "3rd Generation Partnership Project; Technical Specification Group Radio Access Network; NG-RAN; Architecture description (Release 15)", Mar. 2018.

3GPP TS 38.410 V0.9.0, "3rd Generation Partnership Project; Technical Specification Group Radio Access Network; NG-RAN; NG general aspect and principles (Release 15)", Apr. 2018.

3GPP TS 38.413 V0.8.0, "3rd Generation Partnership Project; Technical Specification Group Radio Access Network; NG-RAN; NG Application Protocol (NGAP) (Release 15)", Apr. 2018.

3GPP TS 38.420 V0.8.0, "3rd Generation Partnership Project; Technical Specification Group Radio Access Network; NG-RAN; Xn general aspects and principles (Release 15)", Apr. 2018.

3GPP TS 38.423 V0.8.0, "3rd Generation Partnership Project; Technical Specification Group Radio Access Network; NG-RAN; Xn application protocol (XnAP) (Release 15)" Apr. 2018.

(56) References Cited

OTHER PUBLICATIONS

3GPP TS 38.473 V15.1.1, "3rd Generation Partnership Project; Technical Specification Group Radio Access Network; NG-RAN; F1 application protocol (F1AP) (Release 15)", Apr. 2018.

3GPP TR 38.801 V14.0.0, "3rd Generation Partnership Project; Technical Specification Group Radio Access Network; Study on new radio access technology: Radio access architecture and interfaces (Release 14)", Mar. 2017.

3GPP TR 38.802 V14.2.0, "3rd Generation Partnership Project; Technical Specification Group Radio Access Network; Study on New Radio Access Technology Physical Layer Aspects (Release 14)", Sep. 2017.

3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.

3GPP TR 38.900 V14.3.1, "3rd Generation Partnership Project; Technical Specification Group Radio Access Network; Study on channel model for frequency spectrum above 6 GHz (Release 14)", Jul. 2017.

3GPP TR 38.912 V14.1.0, "3rd Generation Partnership Project; Technical Specification Group Radio Access Network; Study on New Radio (NR) access technology (Release 14)", Jun. 2017.

3GPP TR 38.913 V14.3.0, "3rd Generation Partnership Project; Technical Specification Group Radio Access Network; Study on Scenarios and Requirements for Next Generation Access Technologies; (Release 14)", Jun. 2017.

3GPP TS 38.470 V15.1.0, "3rd Generation Partnership Project; Technical Specification Group Radio Access Network; NG-RAN; F1 general aspects and principles (Release 15)", Mar. 2018.

International Search Report and Written Opinion of the International Searching Authority issued for corresponding International Patent Application No. PCT/JP2018/023500, dated Jul. 31, 2018, with an English translation.

Extended European search report with supplementary European search report and the European search opinion issued by the European Patent Office for corresponding European Patent Application No. 18923191.3—1215, dated Jun. 1, 2021.

Mediatek Inc. et al., "Duplicate discard based on HARQ feedback", Agenda Item: 10.3.3.5, 3GPP TSG-RAN WG2 Meeting #101, R2-1803166, Athens, Greece, Feb. 26-Mar. 2, 2018.

Examination Report issued by the Patent Office of India for corresponding Indian Patent Application No. 202037055134, dated Jan. 5, 2022, with an English translation.

Non-Final Office Action issued by the United States Patent and Trademark Office for corresponding U.S. Appl. No. 17/128,185, electronically delivered on Apr. 29, 2022.

Notice of Allowance issued by the United States Patent and Trademark Office for corresponding U.S. Appl. No. 17/128,185, electronically delivered on Aug. 24, 2022.

Huawei et al., "LCP priority and procedure", Agenda Item: 10.3.1.7, 3GPP TSG-RAN2 Meeting #99bis, R2-1710372, Resubmission of R2-1708910, Prague, Czech Republic, Oct. 9-13, 2017.

Samsung, "Discussion on Prioritization between MAC CE and LCH", Agenda Item: 10.3.1.7, 3GPP TSG-RAN WG2 Meeting #99bis, R2-1711598, Prague, Czech Republic, Oct. 9-13, 2017.

Lenovo et al., "LCP procedure for NR", Agenda Item: 10.3.1.7. 3GPP TSG-RAN WG2 Meeting #100, R2-1712912, Reno, USA, Nov. 27-Dec. 1, 2017.

First Notification of Office Action issued by the China National Intellectual Property Administration for corresponding Chinese Patent Application No. 201880094793.4, dated Apr. 25, 2023, with an English translation.

* cited by examiner

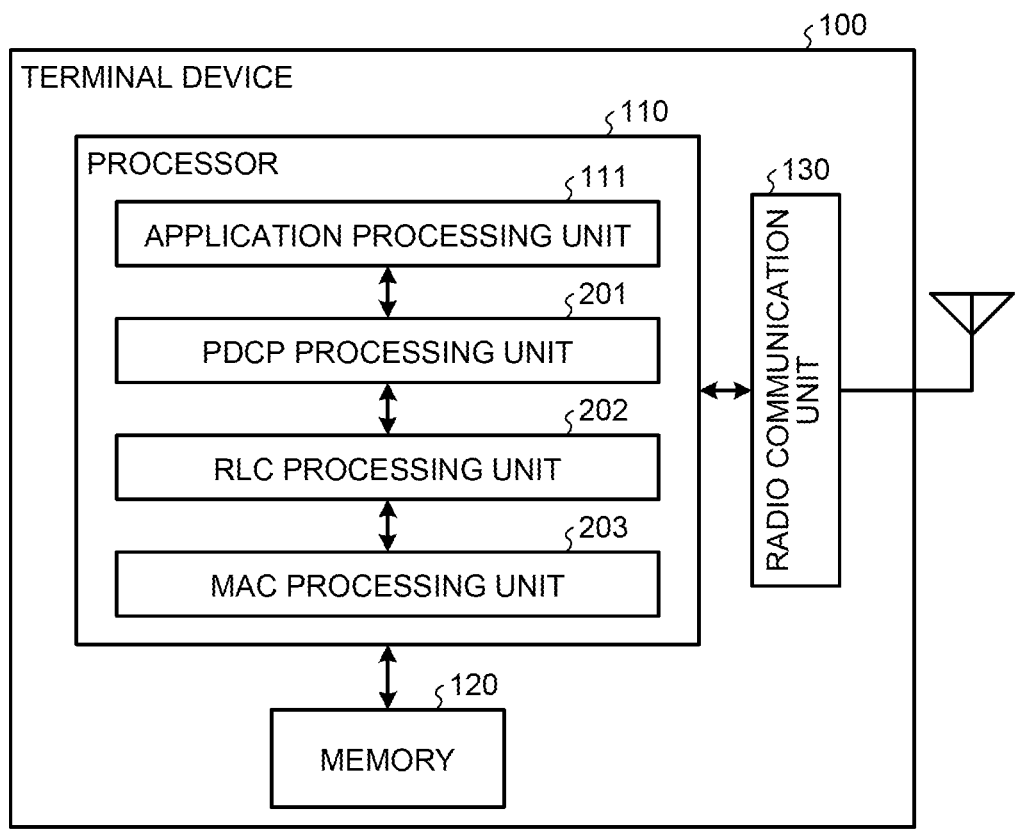

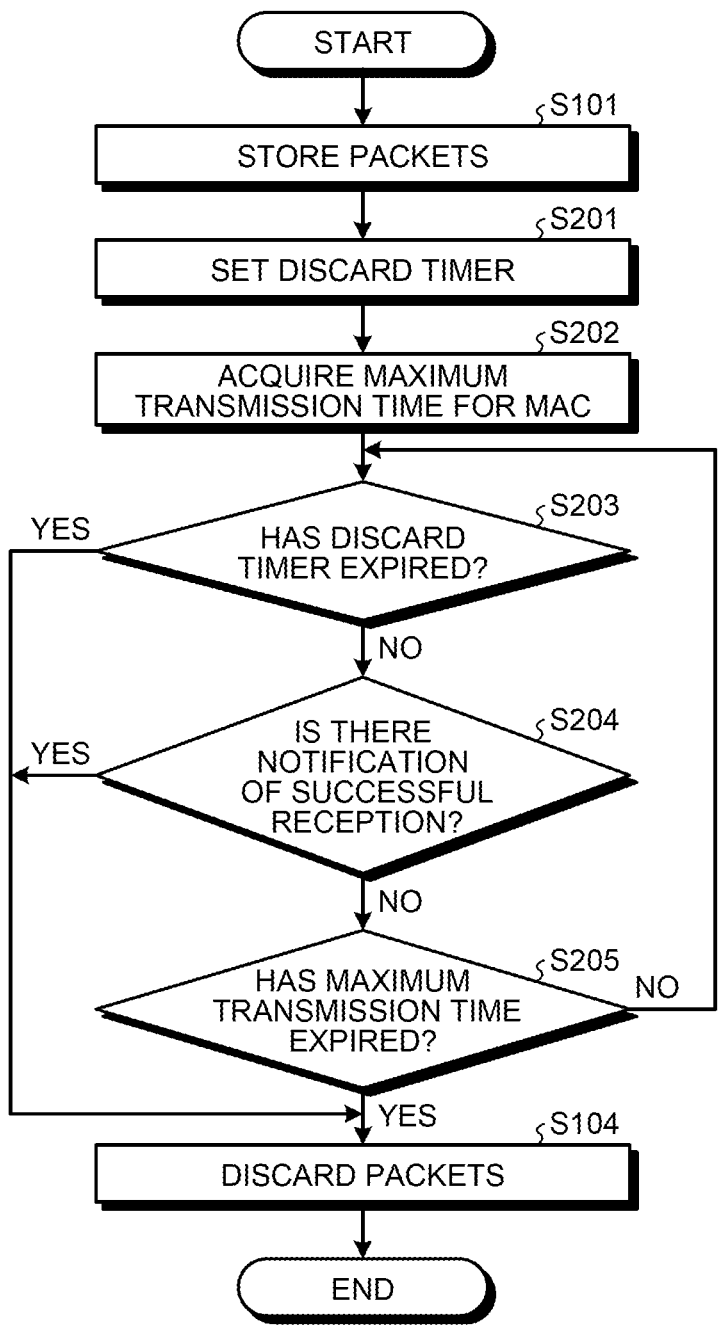

FIG.6

| 5.3 SDU discard |
|---|
| When the discardTimer expires for a PDCP SDU, or the successful delivery of a PDCP SDU is confirmed by PDCP status report, <u>or maxPUSCH-Duration (as specified in TS 38.321) [4] elapses,</u> the transmitting PDCP entity shall discard the PDCP SDU along with the corresponding PDCP Data PDU. If the corresponding PDCP Data PDU has already been submitted to lower layers, the discard is indicated to lower layers. |
| For SRBs, when upper layers request a PDCP SDU discard, the PDCP entity shall discard all stored PDCP SDUs and PDCP PDUs. |
| NOTE: Discarding a PDCP SDU already associated with a PDCP SN causes a SN gap in the transmitted PDCP Data PDUs, which increases PDCP reordering delay in the receiving PDCP entity. It is up to UE implementation how to minimize SN gap after SDU discard. |

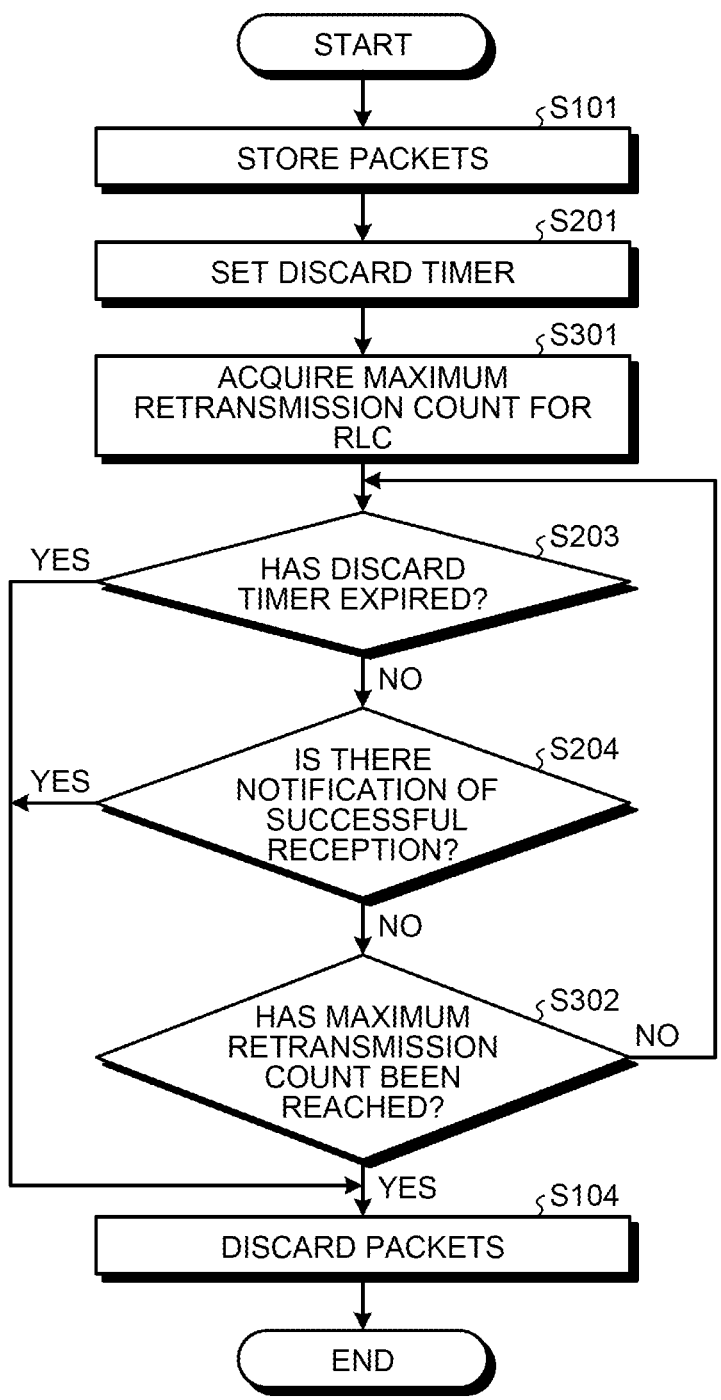

FIG.8

5.3 SDU discard

When the discardTimer expires for a PDCP SDU, or the successful delivery of a PDCP SDU is confirmed by PDCP status report, or maxRetxThreshold (as specified in TS 38.322) [5] is reached, the transmitting PDCP entity shall discard the PDCP SDU along with the corresponding PDCP Data PDU. If the corresponding PDCP Data PDU has already been submitted to lower layers, the discard is indicated to lower layers.

For SRBs, when upper layers request a PDCP SDU discard, the PDCP entity shall discard all stored PDCP SDUs and PDCP PDUs.

NOTE: Discarding a PDCP SDU already associated with a PDCP SN causes a SN gap in the transmitted PDCP Data PDUs, which increases PDCP reordering delay in the receiving PDCP entity. It is up to UE implementation how to minimize SN gap after SDU discard.

TRANSMITTING DEVICE AND BUFFER CONTROL METHOD

CROSS-REFERENCE TO RELATED APPLICATION

This application is a continuation of U.S. application Ser. No. 17/128,185, filed on Dec. 20, 2020, which is a continuation of International Application No. PCT/JP2018/023500, filed on Jun. 20, 2018 and designating the U.S., the entire contents of each are incorporated herein by reference.

FIELD

The present disclosure relates to a transmitting device and a buffer control method.

BACKGROUND

In present networks, traffic of mobile terminals (smartphones and feature phones) occupies most of network resources. Furthermore, traffic of the mobile terminals tends to continuously increase.

On the other hand, along with wide deployment of Internet of things (IoT) services (e.g., transportation systems, smart meters, and monitoring systems for devices), it has been demanded to support services with a variety of requirements. To this end, in the communication standards for the fifth generation mobile communications (5G or new radio (NR)), such technologies have been demanded that achieve further higher data rate, larger capacity, and lower latency, in addition to the standard technologies for the fourth generation mobile communications (4G) (e.g., Non Patent Literatures 1 to 11). Note that the 3GPP working groups (e.g., TSG-RAN WG1 and TSG-RAN WG2) are now studying technologies for the fifth generation communication standards. (Non Patent Literatures 12 to 39). At this moment, a first edition of the 5G standard specifications that 3GPP has stipulated has been released.

As described above, to support a wide variety of services for 5G, it has been assumed to support many use cases that are classified into enhanced mobile broadband (eMBB), Massive machine type communications (MTC), and ultra-reliable and low latency communication (URLLC).

Furthermore, in the communication standards for radio communication systems, generally, functions of radio communications are divided into a series of layers, which is referred to as protocol stack (also referred to as layered protocol), and its specifications have been stipulated. For example, a physical layer is defined as a first layer, a data link layer is defined as a second layer, and a network layer is defined as a third layer. In the fourth generation mobile communication systems including long term evolution (LTE), for example, the second layer is divided into a plurality of sub-layers including a medium access control (MAC) layer, a radio link control (RLC) layer, and a packet data convergence protocol (PDCP) layer. Furthermore, in the fourth generation mobile communication systems, the first layer includes a physical (PHY) layer, and the third layer includes a radio resource control (RRC) layer (the RRC layer includes a control plane only). Note that the MAC layer, the RLC layer, and the PDCP layer constitute the sub-layers of the second layer, as described above, and the layers may be respectively referred to as an MAC sub-layer, an RLC sub-layer, and a PDCP sub-layer.

Each layer in a transmitting device in a radio communication system executes processing conforming to a predetermined protocol, such as adding a header, on a data block (also referred to as a service data unit (SDU)) sent from an upper layer, generates a protocol data unit (PDU), and forwards the generated PDU to a lower layer. For example, the RLC layer for LTE regards a PDCP-PDU representing a data block sent from the PDCP layer that is an upper layer as an RLC-SDU, and concatenates a plurality of RLC-SDUs within a range that does not exceed a transport block (TB) length notified from a lower layer to generate an RLC-PDU. Such an RLC-PDU to which an RLC header having a sequence number (SN) is added in the RLC layer is forwarded to a lower layer, that is, the MAC layer.

Each layer in a receiver in the radio communication system receives a data block (i.e., a PDU) from a lower layer, removes the header, for example, reassembles data blocks (i.e., SDUs), and forwards the reassembled data blocks to an upper layer. For example, the RLC layer for LTE refers to the RLC header added to a data block (also referred to as an MAC-SDU or an RLC-PDU) from the lower layer, that is, the MAC layer, executes processing such as reassembling a plurality of RLC-SDUs stored in a single RLC-PDU, and forwards the RLC-SDUs to an upper layer, that is, the PDCP layer. At this time, to compensate the order of the RLC-SDUs for the upper layer when the RLC-SDUs are to be reassembled, ordering processing is executed based on the RLC sequence numbers that the RLC headers include. Then, if it is detected that an RLC sequence number is missing, an RLC re-transmission control is executed to request the transmitting device for re-transmission of the RLC-PDU.

According to the 5G specifications, priority control referred to as logical channel prioritization (LCP) takes place, in the MAC layer, on uplink data (Non Patent Literature 22). Under the LCP, for example, priority control takes place on each data to suppress performance degradation (starvation) from occurring along with priority allocation of radio resources in accordance with required latency. Specifically, parameters including bit rate are configured for a logical channel (LCH) through which each data is transmitted, and priority control takes place to satisfy the parameters (also representing requirements). However, when priority control takes place for each channel, granularity becomes finer excessively, imposing the terminal device to process a large amount of data. Then, in some cases, logical channels where requirements are identical to each other are aggregated to generate a logical channel group (LCG), and priority control takes place per LCG.

Furthermore, in some radio communication systems, for example, data is temporarily stored in a buffer, in the RLC layer or the PDCP layer, until a transmitting device transmits the data. The data stored in the buffer is discarded when a discard timer set beforehand has expired, for example.

Non Patent Literature 1: 3GPP TS 36.133 V15.2.0 (2018-03)
Non Patent Literature 2: 3GPP TS 36.211 V15.1.0 (2018-03)
Non Patent Literature 3: 3GPP TS 36.212 V15.1.0 (2018-03)
Non Patent Literature 4: 3GPP TS 36.213 V15.1.0 (2018-03)
Non Patent Literature 5: 3GPP TS 36.300 V15.1.0 (2018-03)
Non Patent Literature 6: 3GPP TS 36.321 V15.1.0 (2018-03)
Non Patent Literature 7: 3GPP TS 36.322 V15.0.1 (2018-04)
Non Patent Literature 8: 3GPP TS 36.323 V14.5.0 (2017-12)
Non Patent Literature 9: 3GPP TS 36.331 V15.1.0 (2018-03)
Non Patent Literature 10: 3GPP TS 36.413 V15.1.0 (2018-03)
Non Patent Literature 11: 3GPP TS 36.423 V15.1.0 (2018-03)
Non Patent Literature 12: 3GPP TS 36.425 V14.1.0 (2018-03)

Non Patent Literature 13: 3GPP TS 37.340 V15.1.0 (2018-03)
Non Patent Literature 14: 3GPP TS 38.201 V15.0.0 (2017-12)
Non Patent Literature 15: 3GPP TS 38.202 V15.1.0 (2018-03)
Non Patent Literature 16: 3GPP TS 38.211 V15.1.0 (2018-03)
Non Patent Literature 17: 3GPP TS 38.212 V15.1.1 (2018-04)
Non Patent Literature 18: 3GPP TS 38.213 V15.1.0 (2018-03)
Non Patent Literature 19: 3GPP TS 38.214 V15.1.0 (2018-03)
Non Patent Literature 20: 3GPP TS 38.215 V15.1.0 (2018-03)
Non Patent Literature 21: 3GPP TS 38.300 V15.1.0 (2018-03)
Non Patent Literature 22: 3GPP TS 38.321 V15.1.0 (2018-03)
Non Patent Literature 23: 3GPP TS 38.322 V15.1.0 (2018-03)
Non Patent Literature 24: 3GPP TS 38.323 V15.1.0 (2018-03)
Non Patent Literature 25: 3GPP TS 38.331 V15.1.0 (2018-03)
Non Patent Literature 26: 3GPP TS 38.401 V15.1.0 (2018-03)
Non Patent Literature 27: 3GPP TS 38.410 V0.9.0 (2018-04)
Non Patent Literature 28: 3GPP TS 38.413 V0.8.0 (2018-04)
Non Patent Literature 29: 3GPP TS 38.420 V0.8.0 (2018-04)
Non Patent Literature 30: 3GPP TS 38.423 V0.8.0 (2018-04)
Non Patent Literature 31: 3GPP TS 38.470 V15.1.0 (2018-03)
Non Patent Literature 32: 3GPP TS 38.473 V15.1.1 (2018-04)
Non Patent Literature 33: 3GPP TR 38.801 V14.0.0 (2017-04)
Non Patent Literature 34: 3GPP TR 38.802 V14.2.0 (2017-09)
Non Patent Literature 35: 3GPP TR 38.803 V14.2.0 (2017-09)
Non Patent Literature 36: 3GPP TR 38.804 V14.0.0 (2017-03)
Non Patent Literature 37: 3GPP TR 38.900 V14.3.1 (2017-07)
Non Patent Literature 38: 3GPP TR 38.912 V14.1.0 (2017-06)
Non Patent Literature 39: 3GPP TR 38.913 V14.3.0 (2017-06)

However, there is a problem in that, when data is stored in the buffer, in the RLC layer or the PDCP layer, some kinds of data held in the buffer do not satisfy latency requirements for data. For example, when a discard timer is configured with a relatively longer time such as 10 ms, a time until data held in a buffer is to be discarded increases, generating a head of line blocking (HOL). As a result, when data (low latency data) for which a requirement of latency is below 1 ms is newly generated, for example, it sometimes takes more time until the low latency data is transmitted, dissatisfying latency requirements.

SUMMARY

According to an aspect of an embodiment of the disclosure, a transmitting device includes: a first layer processor configured to include a buffer to store therein transmission data, the first layer processor configured to execute processing for a first layer on the transmission data; a second layer processor configured to execute processing for a second layer that differs from the first layer on the transmission data; and a transmitter configured to transmit the transmission data processed by the first layer processor and the second layer processor. The first layer processor discards the transmission data stored in the buffer in accordance with a parameter used for transmission control in the processing for the second layer.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a block diagram illustrating a configuration of a terminal device according to a second embodiment.

FIG. 4 is a view illustrating a specific example of a maximum transmission time.

FIG. 5 is a flowchart illustrating a buffer control method according to the second embodiment.

FIG. 6 is a view illustrating an example of describing contents according to the second embodiment in standard specifications.

FIG. 7 is a flowchart illustrating a buffer control method according to a third embodiment.

FIG. 8 is a view illustrating an example of describing contents according to the third embodiment in standard specifications.

DESCRIPTION OF EMBODIMENTS

Embodiments of a transmitting device and a buffer control method that the present application discloses will be described herein in detail with reference to the accompanying drawings. Note that the embodiments do not intend to limit the present disclosure. In here, although a terminal device is described as an example of the transmitting device, the transmitting device is not necessarily limited to such a terminal device, but examples of the transmitting device include base station devices and similar devices. Furthermore, unless otherwise particularly distinguished, service data units (SDUs) and protocol data units (PDUs) in each layer will each be hereinafter simply referred to as a "packet".

[a] First Embodiment

Figure 1:
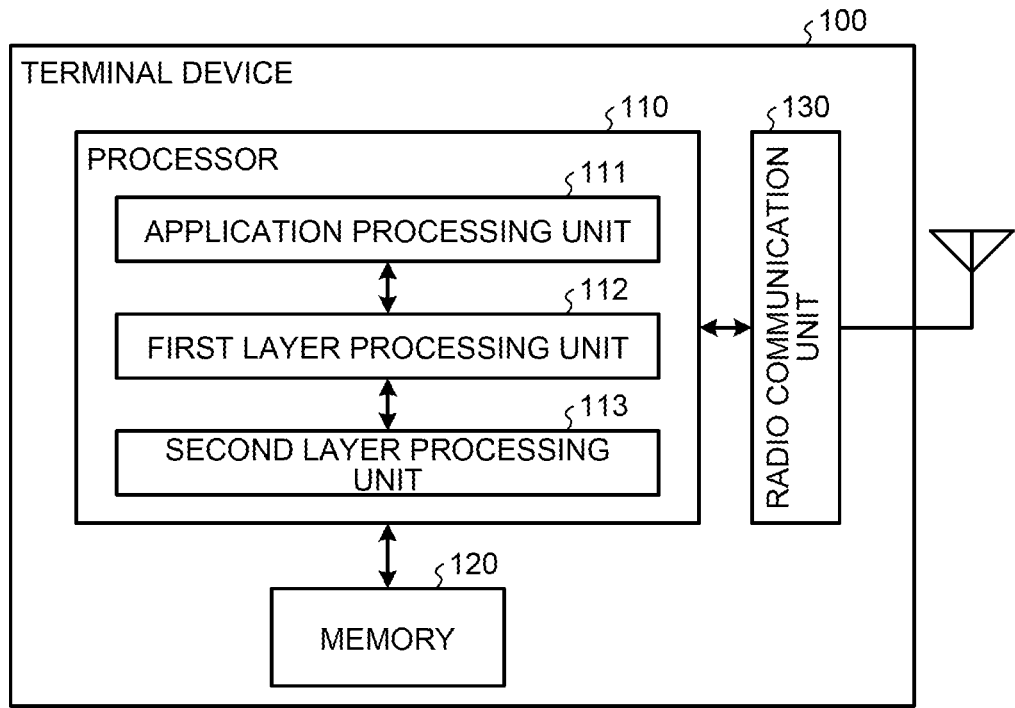
FIG. 1 is a block diagram illustrating a configuration of a terminal device according to a first embodiment.

FIG. 1 is a block diagram illustrating a configuration of a terminal device 100 according to a first embodiment. The terminal device 100 illustrated in FIG. 1 includes a processor 110, a memory 120, and a radio communication unit 130.

The processor 110 includes, for example, a central processing unit (CPU), a field programmable gate array (FPGA), or a digital signal processor (DSP) to wholly control in an integrated manner the terminal device 100. Specifically, the processor 110 includes an application processing unit 111, a first layer processing unit 112, and a second layer processing unit 113.

The application processing unit 111 is configured to execute processing for a variety of applications. For example, the application processing unit 111 generates transmission data to be transmitted from the terminal device 100 to a non-illustrated base station device via an uplink channel. Examples of the transmission data include, for example, low latency data for which a requested amount of latency is below 1 ms.

The first layer processing unit 112 is configured to execute processing for a first layer. For example, the first layer processing unit 112 adds a header for the first layer to packets (SDUs) of the transmission data that the application processing unit 111 has generated to generate a PDU for the first layer. In here, the first layer processing unit 112 includes a buffer, and temporarily stores, in the buffer, the target packets to be processed. Then, the first layer processing unit 112 controls the discarding of the packets stored in the buffer.

Specifically, the first layer processing unit 112 sets, when a packet is stored in the buffer, first information defining conditions for discarding the packet. At this time, the first layer processing unit 112 acquires second information used for transmission control in the second layer processing unit 113, and sets the first information in accordance with the second information. That is, the first layer processing unit 112 uses parameters for a different layer (e.g., a lower layer), that is, a second layer, and sets discard conditions for the packet.

After setting the discard conditions for the packet, the first layer processing unit 112 monitors whether the discard conditions are satisfied, and, when the discard conditions are satisfied, discards the corresponding packet from the buffer.

The second layer processing unit 113 is configured to execute processing for the second layer that lies lower than the first layer. For example, the second layer processing unit 113 regards the PDU that the first layer processing unit 112 has generated for the first layer as SDUs, adds a header for the second layer to the SDUs, and generates a PDU for the second layer. The second layer processing unit 113 uses second information to execute transmission control for a packet. That is, the second layer processing unit 113 executes, in accordance with the second information, priority control for transmission of a packet, retransmission control, and other controls. As described above, the first layer processing unit 112 uses the second information to set discard conditions for a packet.

The memory 120 includes, for example, a random access memory (RAM) or a read only memory (ROM), and is configured to store therein information that the processor 110 uses for executing processing.

The radio communication unit 130 is configured to execute radio transmission processing including a digital/analog (D/A) conversion and an up conversion on the transmission data that the processor 110 has generated, and to wirelessly transmit the converted data via an antenna, for example. Furthermore, the radio communication unit 130 is configured to execute radio reception processing including a down conversion and an analog/digital (A/D) conversion on reception data received in a wireless manner via the antenna, and to output the converted data to the processor 110, for example.

Figure 2:
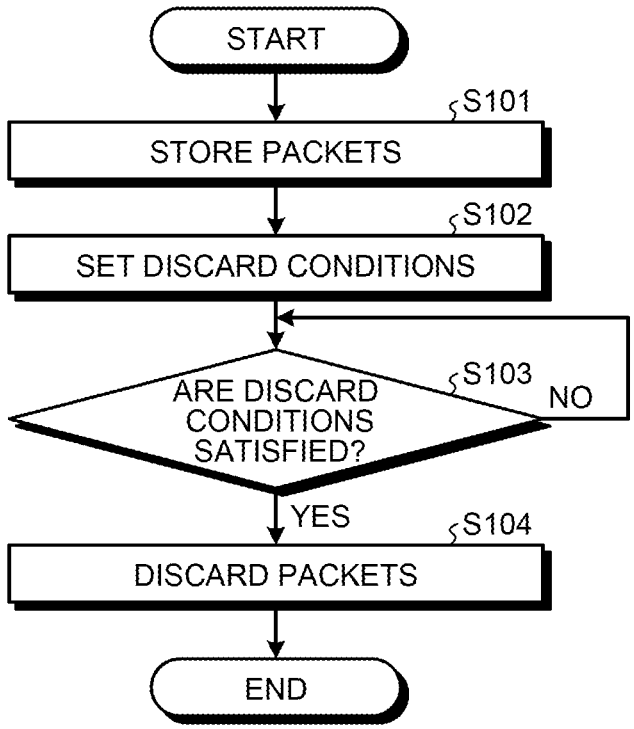
FIG. 2 is a flowchart illustrating a buffer control method according to the first embodiment.

Next, a buffer control method in the terminal device 100 configured as described above will be described herein with reference to the flowchart illustrated in FIG. 2. The buffer control method described below is a control method for the buffer that the first layer processing unit 112 includes.

Transmission data that the application processing unit 111 generates is output to the first layer processing unit 112, is divided into packets each having a predetermined length, and is stored in the buffer that the first layer processing unit 112 includes (step S101). When the packets are to be stored in the buffer, first information specifying discard conditions is set to each packet (step S102). That is, the first layer processing unit 112 acquires second information that the second layer processing unit 113 uses for transmission control, and sets the first information in accordance with the second information.

After setting the discard conditions for the packets, the first layer processing unit 112 executes processing for the first layer on the packets, and monitors whether the packets stored in the buffer each satisfy the discard conditions (step S103). That is, it is monitored whether the discard conditions that the first information indicates are satisfied, and, if a packet satisfies the discard conditions (Yes at step S103), the first layer processing unit 112 discards the packet (step S104). Therefore, the packet for the first layer is discarded under the discard conditions in accordance with the parameters used for transmission control for the lower, second layer, shortening a buffering time within which the packet is held in the buffer for the first layer. As a result, even when low latency data is generated as new transmission data, processing for the first layer is promptly executed on packets of the low latency data, making it possible to transmit the low latency data with less latency. Furthermore, as a result of shortening the buffering time within which the packet is held in the buffer, it is possible to make the buffer smaller in size.

As described above, according to the present embodiment, first information defining discard conditions for a packet for the first layer is set in accordance with second information regarding transmission control for the second layer, and a packet satisfying the discard conditions is discarded from the buffer for the first layer. Therefore, it is possible to shorten a buffering time within which a packet is held in the buffer, and, even when low latency data is generated as new transmission data, it is possible to reduce latency until the low latency data is to be transmitted. As a result, it is possible to satisfy latency requirements for the low latency data.

Note that, although the buffer control method regarding the buffer for the first layer has been mainly described above in the first embodiment, another layer processing unit (e.g., a third layer processing unit) which is different from processing units for the first layer and the second layer may include a buffer. Then, when packets are to be stored in the buffer for the third layer, the buffer control method described above in the first embodiment may be applied for the buffer for the third layer. In this case, packets for initial transmission being already wirelessly transmitted and packets for retransmission may be excluded from the application of the buffer control method.

[b] Second Embodiment

FIG. 3 is a block diagram illustrating a configuration of the terminal device 100 according to a second embodiment. It is to be noted that, in FIG. 3, like reference numerals designate identical or corresponding components to those in FIG. 1, and duplicated descriptions are thus omitted. In the terminal device 100 illustrated in FIG. 3, an internal structure of the processor 110 differs from the internal structure of the terminal device 100 illustrated in FIG. 1. That is, the processor 110 illustrated in FIG. 3 includes, in addition to the application processing unit 111, a PDCP processing unit 201, an RLC processing unit 202, and an MAC processing unit 203.

The PDCP processing unit 201 is configured to execute processing for a PDCP layer. For example, the PDCP processing unit 201 adds a header for the PDCP layer to packets (PDCP-SDUs) of transmission data that the application processing unit 111 generates to generate a PDCP-PDU. The PDCP processing unit 201 includes a buffer, and temporarily stores, in the buffer, the target packets to be processed. Then, the PDCP processing unit 201 controls the discarding of the packets stored in the buffer.

Specifically, the PDCP processing unit 201 sets, when a packet is stored in the buffer, a discard timer specifying a time until the packet is to be discarded. Furthermore, the PDCP processing unit 201 acquires a maximum transmission time that the MAC processing unit 203 uses for transmission control, and sets, in accordance with the maximum transmission time, a time until the packet is to be discarded, separately from the discard timer described above. That is, the PDCP processing unit 201 sets discard conditions for the packet by using parameters of an MAC layer that is a lower layer than the PDCP layer.

After setting the discard conditions for the packet, the PDCP processing unit 201 monitors whether the discard conditions are satisfied, and, when the discard conditions are satisfied, discards the corresponding packet from the buffer.

The RLC processing unit 202 is configured to execute processing for an RLC layer that lies lower than the PDCP layer. For example, the RLC processing unit 202 regards the PDCP-PDU that the PDCP processing unit 201 has generated as an RLC-SDU, adds a header of the RLC layer to the RLC-SDU, and generates an RLC-PDU. The processing that the RLC processing unit 202 executes for the RLC layer includes retransmission control for a packet, for example.

The RLC processing unit 202 includes a buffer, and, when pre-processing is to be executed, for example, temporarily stores, in the buffer, instead of the PDCP processing unit 201, the packets of the transmission data that the application processing unit 111 has generated. Therefore, the RLC processing unit 202 may control, similar to the PDCP processing unit 201, the discarding of the packets stored in the buffer.

The MAC processing unit 203 is configured to execute processing for the MAC layer that lies lower than the PDCP layer and the RLC layer. For example, the MAC processing unit 203 regards the RLC-PDU that the RLC processing unit 202 has generated as an MAC-SDU, adds a header of the MAC layer to the MAC-SDU, and generates an MAC-PDU. The processing that the MAC processing unit 203 executes for the MAC layer includes scheduling and priority control for a packet, for example. In the priority control that the MAC processing unit 203 executes, logical channel prioritization (LCP) is executed for controlling the priority of a logical channel, for example. Specifically, logical channels, where required quality of service (QoS) are identical to each other, are aggregated to generate a logical channel group (LCG), and priority control takes place per LCG.

In the LCP for the MAC layer, priority control takes place with three parameters that are (1) to (3) as described below, for example.

(1) allowedSCS-List: This is a parameter that specifies a sub-carrier spacing for an LCG for transmitting low latency data.

(2) maxPUSCH-Duration: This is a parameter that indicates a maximum transmission time for a physical uplink shared channel (PUSCH) used for wireless transmission with an LCG. More specifically, the parameter defines a time from a timing when transmission using a PUSCH is granted to a timing when the transmission using the PUSCH is actually executed. It can be said that the smaller the set maxPUSCH-Duration, the lower the latency required for an LCG. A value selected from among a plurality of candidates is set to maxPUSCH-Duration. That is, as illustrated in FIG. 4, for example, candidates of maxPUSCH-Duration include: 0.02 ms, 0.04 ms, 0.0625 ms, 0.125 ms, 0.25 ms, and 0.5 ms, and a value selected from among the above values in accordance with the priority of an LCG is set.

(3) configuredGrantType1Allowed: This is a parameter that indicates whether a radio resource used for wireless transmission with an LCG corresponds to, for example, a radio resource determined beforehand such as a periodical radio resource, or a radio resource that is dynamically determined with an UL grant.

As described above, a maximum transmission time that maxPUSCH-Duration indicates is set separately from a discard timer, as a time until the PDCP processing unit 201 discards a packet.

Next, a buffer control method in the terminal device 100 configured as described above will be described herein with reference to the flowchart illustrated in FIG. 5. The buffer control method described below is a control method for the buffer that the PDCP processing unit 201 includes. It is to be noted that, in FIG. 5, like reference numerals designate identical or corresponding components to those in FIG. 2.

Transmission data that the application processing unit 111 generates is output to the PDCP processing unit 201, is divided into packets having a predetermined length, and is stored in the buffer that the PDCP processing unit 201 includes (step S101). When the packets are to be stored in the buffer, a discard timer specifying a time until each of the packets is to be discarded is set (step S201). The discard timer corresponds to a period within which data is available for an application, and may be set with a time of approximately 10 ms, for example.

Furthermore, the PDCP processing unit 201 acquires a maximum transmission time representing one of parameters for priority control in the MAC processing unit 203 (step S202). The maximum transmission time is used as a time until a packet is to be discarded, separately from the discard timer described above. That is, the PDCP processing unit 201 acquires parameters used for a control for a lower layer, that is, the MAC layer, and a time until a packet is to be discarded is set in accordance with the acquired parameters. As illustrated in FIG. 4, the maximum transmission time corresponds to a relatively shorter time that is below 1 ms.

After setting the time until the packet is to be discarded, the PDCP processing unit 201 executes processing for the PDCP layer on the packet, and monitors whether the discard conditions are satisfied for each of the packets stored in the buffer.

Specifically, it is determined whether the discard timer set per packet has expired (step S203). As a result of the determination that the discard timer has expired (Yes at step S203), the PDCP processing unit 201 discards the packet (step S104). On the other hand, if the discard timer has not yet expired (No at step S203), it is determined whether there is a notification that the packet has been received successfully (step S204). That is, since a device on a reception side periodically transmits a status report (SR) to the PDCP layer, the status report makes it possible to determine whether a packet has been received successfully. Then, if the PDCP processing unit 201 has been notified that the packet has been received successfully (Yes at step S204), the PDCP processing unit 201 discards the packet (step S104). On the other hand, if there is no notification of successful reception (No at step S204), it is determined whether the maximum transmission time has expired after the packet is stored in the buffer (step S205). That is, it is determined whether the maximum transmission time for priority control, in the MAC layer, has expired. Then, if the packet has been stored and the maximum transmission time has expired (Yes at step S205), the PDCP processing unit 201 discards the packet (step S104).

As described above, it is monitored whether discard conditions are satisfied, and a packet satisfying the discard conditions is discarded from the buffer, shortening a buffering time within which the packet is held in the buffer for the PDCP layer. In particular, in a way that a maximum transmission time used for priority control for the MAC layer that lies lower than the PDCP layer is utilized as one of discard conditions, packet is discarded in a shorter time than a discard time for an application and latency of wireless transmission can be reduced. In other words, even when low latency data is generated as new transmission data, processing for the PDCP layer is promptly executed on packets of the low latency data, making it possible to transmit the low latency data with less latency.

As described above, according to the present embodiment, a time defining one of discard conditions for a packet for the PDCP layer is set in accordance with a maximum transmission time for priority control for the MAC layer, and a packet for which the maximum transmission time has expired after storing the data is discarded from the buffer for the PDCP layer. Therefore, it is possible to shorten a buffering time within which a packet is held in the buffer, and, even when low latency data is generated as new transmission data, it is possible to reduce latency until the low latency data is to be transmitted. As a result, it is possible to satisfy latency requirements for the low latency data.

Note that, with the buffer control method according to the second embodiment described above, it is possible to modify descriptions regarding the SDU discard described in Non Patent Literature 24 (TS38.323) to those described in FIG. 6, for example. That is, it may be specified that the PDCP-SDU is discarded, when a discard timer for a PDCP-SDU has expired, when it is confirmed that the PDCP-SDU has been received successfully through a status report, or when maxPUSCH-Duration has expired.

Furthermore, although the buffer control method regarding the buffer for the PDCP layer has been mainly described above in the second embodiment, the RLC processing unit 202 also includes the buffer, as described above. Then, for example, when pre-processing takes place, the buffer control method described above in the second embodiment may be applied for the buffer for the RLC layer, since a packet is stored in the buffer for the RLC layer. In this case, packets for initial transmission being already wirelessly transmitted and packets for retransmission may be excluded from the application of the buffer control method.

Furthermore, in the second embodiment described above, since processing takes place within a cross layer between layers where characteristics are similar to each other (e.g., between the PDCP layer and the MAC layer in a layer 2), it is possible to make a protocol (e.g., a terminal protocol) simpler than a case where processing takes place between layers where characteristics differ from each other (e.g., between an application layer and the layer 2).

[c] Third Embodiment

A configuration of a terminal device according to a third embodiment is similar to the configuration of the terminal device 100 according to the second embodiment (FIG. 3), and duplicated descriptions are thus omitted. In the third embodiment, a buffer control method in the PDCP processing unit 201 differs from the buffer control method according to the second embodiment.

FIG. 7 is a flowchart illustrating the buffer control method according to the third embodiment. The buffer control method described below is a control method for the buffer that the PDCP processing unit 201 includes. It is to be noted that, in FIG. 7, like reference numerals designate identical or corresponding components to those in FIGS. 2 and 5.

Transmission data that the application processing unit 111 generates is output to the PDCP processing unit 201, is divided into packets having a predetermined length, and is stored in the buffer that the PDCP processing unit 201 includes (step S101). When the packets are to be stored in the buffer, a discard timer specifying a time until each of the packets is to be discarded is set (step S201). The discard timer corresponds to a period within which data is available for an application, and may be set with a time of approximately 10 ms, for example.

Furthermore, the PDCP processing unit 201 acquires a maximum retransmission count representing one of parameters for re-transmission control in the RLC processing unit 202 (step S301). The maximum retransmission count represents a maximum count within which retransmission is permitted, in the RLC layer which controls retransmission of a packet. That is, in the RLC layer, retransmission of a packet is executed when a NACK indicating that a packet has not been received correctly is sent back from the device on the reception side, and, since a throughput is degraded if the retransmission is repeated limitlessly, an allowable maximum retransmission count is sometimes set. Therefore, the PDCP processing unit 201 acquires a maximum retransmission count used for a control for a lower layer, that is, the RLC layer, and discard conditions for a packet are set in accordance with the acquired maximum re-transmission count.

After setting the discard conditions for a packet, the PDCP processing unit 201 executes processing for the PDCP layer on the packet, and monitors whether the discard conditions are satisfied for each of the packets stored in the buffer.

Specifically, it is determined whether the discard timer set per packet has expired (step S203). As a result of the determination that the discard timer has expired (Yes at step S203), the PDCP processing unit 201 discards the packet (step S104). On the other hand, if the discard timer has not yet expired (No at step S203), it is determined whether there is a notification that the packet has been received successfully (step S204). That is, since the device on the reception side periodically transmits a status report to the PDCP layer, the status report makes it possible to determine whether a packet has been received successfully. Then, if the PDCP processing unit 201 has been notified that the packet has been received successfully (Yes at step S204), the PDCP processing unit 201 discards the packet (step S104). On the other hand, if there is no notification of successful reception (No at step S204), it is determined whether a retransmission count for the packet stored in the buffer has reached the maximum retransmission count (step S302). That is, it is determined whether the maximum retransmission count for retransmission control, in the RLC layer, has been reached. Then, if the re-transmission count for the packet has reached the maximum re-transmission count (Yes at step S302), the PDCP processing unit 201 discards the packet (step S104).

As described above, it is monitored whether discard conditions are satisfied, and a packet satisfying the discard conditions is discarded from the buffer, shortening a buffering time within which the packet is held in the buffer for the PDCP layer. In particular, in a way that a maximum transmission time used for priority control for the RLC layer that lies lower than the PDCP layer is utilized as one of discard conditions, packet for which retransmission fails is discarded early and latency of wireless transmission can be reduced. In other words, even when low latency data is generated as new transmission data, processing for the PDCP layer is promptly executed on packets of the low latency data, making it possible to transmit the low latency data with less latency.

As described above, according to the present embodiment, discard conditions for a packet for the PDCP layer are set in accordance with a maximum retransmission count for retransmission control for the RLC layer, and a packet for which a retransmission count has reached the maximum retransmission count is discarded from the buffer for the PDCP layer. Therefore, it is possible to shorten a buffering time within which a packet is held in the buffer, and, even when low latency data is generated as new transmission data, it is possible to reduce latency until the low latency data is to be transmitted. As a result, it is possible to satisfy latency requirements for the low latency data.

Note that, with the buffer control method according to the third embodiment described above, it is possible to modify descriptions regarding the SDU discard described in Non Patent Literature 24 (TS38.323) to those described in FIG. 8, for example. That is, it may be specified that the PDCP-SDU is discarded, when a discard timer for a PDCP-SDU has expired, when it is confirmed that the PDCP-SDU has been received successfully through a status report, or when a retransmission count has reached maxRetxThreshold indicating a maximum retransmission count for the RLC layer.

Furthermore, although, in the embodiments described above, information for determining discard conditions for a packet in the buffer for an upper layer is acquired from a processing unit for a lower layer, it is not necessarily to acquire information from the processing unit for a lower layer. That is, the base station device may use radio resource control (RRC) signaling, for example, to notify information used to determine discard conditions for a packet. Specifically, as a second discard timer represented in two bits, for example, a parameter (that may be a parameter for which a name such as discardTimer2 is specified, for example) that indicates any value (such as 0.5 ms, 1 ms, 2 ms, or 3 ms) may be specified in an RRC, and some of the value may be notified through RRC signaling (e.g., RRC Reconfiguration message or RRC setup message). Furthermore, as the second discard timer may be a parameter represented in three bits, a value may be specified from among candidates, similarly to maxPUSCH-Duration in the second embodiment described above, and a value may be further specified from among candidates added with other values.

Furthermore, a scaling factor that scales a value of a discard timer may be specified in an RRC through RRC signaling, and a value of the scaling factor may be notified. For example, when a value (such as 10 ms, 20 ms, 30 ms, 40 ms, 50 ms, 60 ms, 75 ms, 100 ms, 150 ms, 200 ms, 250 ms, 300 ms, 500 ms, 750 ms, 1500 ms, or an infinite value) is configurable as a discard timer for the PDCP layer, and a scaling factor of 0.002 is notified, a value of the discard timer may be multiplied with 0.002 for use as discard conditions. In this case, it is possible to use, as discard conditions, a value (such as 0.02 ms, 0.04 ms, 0.06 ms, 0.08 ms, 0.1 ms, 0.12 ms, 0.15 ms, 0.2 ms, 0.3 ms, 0.4 ms, 0.5 ms, 0.6 ms, 1.0 ms, 1.5 ms, 3.0 ms, or an infinite value). Therefore, a time until a packet is to be discarded becomes shorter than a time of which a value of a discard timer is used as is, making it possible to satisfy latency requirements for low latency data. The scaling factor may be dynamically selected from among a plurality of candidates.

Furthermore, conventionally defined parameters may be changed. For example, by taking into account that a value (such as 10 ms, 20 ms, 30 ms, 40 ms, 50 ms, 60 ms, 75 ms, 100 ms, 150 ms, 200 ms, 250 ms, 300 ms, 500 ms, 750 ms, 1500 ms, or an infinite value) is configurable as a conventional discard timer for the PDCP layer, the infinite value may be deleted, and 1 ms may be added. As a result, a value (such as 1 ms, 10 ms, 20 ms, 30 ms, 40 ms, 50 ms, 60 ms, 75 ms, 100 ms, 150 ms, 200 ms, 250 ms, 300 ms, 500 ms, 750 ms, or 1500 ms) is configurable as a discard timer.

Note that, when the first embodiment and the second embodiment described above are combined with each other, the PDCP layer may serve as a first layer, and the MAC layer may serve as a second layer. Furthermore, a value of a discard timer may serve as first information, and maxPUSCH-Duration may serve as second information. Furthermore, when the first embodiment and the third embodiment described above are combined with each other, the PDCP layer may serve as a first layer, the MAC layer may serve as a second layer, and the RLC layer may serve as a third layer.

According to one aspect of the transmitting device and the buffer control method that the present application discloses, there are effects that it is possible to satisfy latency requirements for low latency data.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:

1. A transmitting device comprising:
a buffer configured to store transmission data;
a first layer processor configured to execute processing for a packet data convergence protocol (PDCP) layer on the transmission data;
a second layer processor configured to execute processing for a medium access control (MAC) layer on the transmission data; and
a transmitter configured to transmit the transmission data processed by the first layer processor and the second layer processor; and
a receiver configured to receive, via a radio resource control (RRC) signal, information indicating a second discard time that is shorter than a first discard time in the PDCP layer, wherein the first layer processor is configured to discard the transmission data stored in the buffer when the second discard time expires, the first discard time is selected from any of a plurality of first candidates, the second discard time is selected from any of a plurality of second candidates, and a first minimum value among the plurality of first candidates is larger than a first maximum value among the plurality of second candidates.

2. The transmitting device according to claim 1, wherein a second minimum value among the plurality of second candidates is same value that is a second maximum value among a plurality of third candidates for a maximum transmission time of physical uplink shared channel (PUSCH) used for priority control.

3. The transmitting device according to claim 2, wherein the maximum transmission time is shorter than a discard time that is predetermined in a radio link control (RLC) layer.

4. The transmitting device according to claim 1, wherein the first layer processor discards the transmission data stored in the buffer, when a re-transmission count for the transmission data stored in the buffer reaches a maximum re-transmission count used for re-transmission control for a RLC layer.

5. The transmitting device according to claim 1, wherein the transmitting device is a mobile terminal.

6. A base station device that controls a terminal device by a radio resource control (RRC) signaling, the base station device comprising:
a memory; and
a processor coupled to the memory and configured to:
transmit, via the RRC signaling, information indicating a second discard time that is shorter than a first discard time in a packet data convergence protocol (PDCP) layer, the second discard time being a time transmission data held in a buffer of a mobile device is discarded by the PDCP layer processing, wherein the first discard time is selected from any of a plurality of first candidates, the second discard time is selected from any of a plurality of second candidates, and a first minimum value among the plurality of first candidates is larger than a first maximum value among the plurality of second candidates.

7. A wireless communication system comprising:
a terminal device; and
a base station configured to control the terminal device by a radio resource control (RRC) signaling, wherein
the terminal device includes:
a buffer configured to store transmission data;
a first layer processor configured to execute processing for a packet data convergence protocol (PDCP) layer on the transmission data;
a second layer processor configured to execute processing for a medium access control (MAC) layer on the transmission data; and
a transmitter configured to transmit the transmission data processed by the first layer processor and the second layer processor; and
a receiver configured to receive, via the RRC signaling, information indicating a second discard time that is shorter than a first discard time in the PDCP layer, wherein the first layer processor is configured to discard the transmission data stored in the buffer when the second discard time expires, the first discard time is selected from any of a plurality of first candidates, the second discard time is selected from any of a plurality of second candidates, and a first minimum value among the plurality of first candidates is larger than a first maximum value among the plurality of second candidates.

* * * * *